Patented Sept. 20, 1949

2,482,728

UNITED STATES PATENT OFFICE 2,482,728

DYED HYDRATED OXIDE COATINGS ON MAGNESIUM AND MAGNESIUM-BASE ALLOYS

Herbert K. De Long, Midland, Mich., assignor to The Dow Chemical Company, Midland, Mich., a corporation of Delaware No Drawing. Application December 12, 1946, Serial No. 715,636

1 Claim. (Cl. 148—6.1)

The invention relates to an improved method of coloring hydrated oxide protective coatings upon the surface of articles of magnesium and magnesium-base alloys.

In my prior U. S. Patent No. 2,310,487, issued February 9, 1943, I have described a method of coloring certain hydrated oxide coatings produced upon the surface of articles of magnesium and magnesium-base alloys. These oxide coatings may be produced as hard, dense, thin layers either by subjecting the magnesium article to the action of a 2 to 20 per cent water solution of alkali metal hydroxide under pressure at temperatures of 150° to 250° C. (as set forth in the publication "Dowmetal Bulletin 3a" and my U. S. Patent No. 2,250,472) or by anodizing the article in an aqueous polyhydric alcohol solution of an alkali at temperatures of 50° to 150° C. (as set forth in the publication "Dowmetal Bulletin 39a"). (The bulletins mentioned are publications of The Dow Chemical Company, Midland, Michigan; No. 3a is entitled "Chemical Treatment No. 6 for Dowmetal"; No. 39a is entitled "Dow No. 12 Anodic Treatment for Magnesium.")

Inasmuch as the hydrated oxide coatings thus produced are dense and hard, attempts to produce colored or decorative effects by dipping the coated article into a water solution of a dye are not satisfactory. By the method of my aforesaid patent (2,310,487), this difficulty is overcome by incorporating in the dyeing solution a water-soluble salt of an unsubstituted organic carboxylic acid. I have now found that still more desirable results as regards uniformity and depth of coloring are obtained if, instead of adding to the aqueous dyeing solution an unsubstituted carboxylic acid, there be employed in the dyeing solution boric acid, or boric acid together with a neutral or alkali chromate. The invention, then, consists of the method hereinafter fully described and particularly pointed out in the claim.

In carrying out the invention, the pH of the dyeing solution is maintained between about 6 and 9, and preferably between 6.5 and 8 as by the addition of an appropriate amount of an alkali, if necessary, such as sodium hydroxide. The dyeing solution is maintained preferably at an operating temperature between 80° and 90° C., although other temperatures may be used. Suitable concentrations of boric acid are between about 1 and 20 grams per liter, although a preferable concentration is between 5 and 10 grams, or specifically about 7 grams per liter. The chromate, which may be in the form of sodium, potassium, or ammonium chromate, may be present in amount between about 1 and 50 grams per liter or preferably between about 4 and 20 grams per liter, 10 grams per liter generally being preferred.

A variety of soluble dyes may be used in the invention. However, it has been found that the Neolan dyes, i. e. chromium-containing mordant azo dyes, particularly organo-chromium complex mordant ortho-hydroxy azo dyes (as described in Melliand's Textilber. 6, 674–6 (1925), or in J. Soc. Dyers and Colourists 50, 282 (1934)), are especially suitable. Typical dyes which have been used include:

Neolan Green B
Neolan Green B1 (conc.)
Neolan Bordeaux R (red)
Neolan Orange G
Neolan Yellow G
Neolan Black 2R
Alizarin Sapphire Blue (Colour Index No. 1054)
Naphthol Yellow S (Colour Index No. 10)

The dye is ordinarily employed in a concentration between about 0.1 and about 10 grams per liter, suitably 0.2 to 1.0 gram, although other proportions may sometimes be used.

The duration of immersion in the dyeing solution of the articles to be colored may be between about 2 and 30 minutes, although other lengths of time may be employed. Usually about 6 minutes' immersion suffices to produce a satisfactory depth of color in most instances.

In forming a colored article, the magnesium or magnesium-base alloy article is first subjected to a suitable treatment to form a hard, dense hydrated oxide protective coating, such as those already considered. The article is then buffed or brushed, if necessary, to remove any loose material and to produce a high gloss, after which it is immersed in the dye solution to color the coating. The article is then raised and dried, after which it may be waxed, if desired, or polished to improve the gloss.

I claim:

In a method of coloring a hard, dense, thin hydrated oxide protective coating upon surfaces of articles of magnesium and magnesium-base alloys, the steps which comprise immersing the coated article in a solution consisting per liter thereof of water, a water-soluble dye, an alkali, about 1 to 20 grams of boric acid, about 1 to 50 grams of a water-soluble chromate selected from the group consisting of sodium, potassium, and ammonium chromate, said solution having a pH between about 6 and 9.

HERBERT K. DE LONG.

REFERENCES CITED

The following references are of record in the file of this patent:

UNITED STATES PATENTS

| Number | Name | Date |
| --- | --- | --- |
| 2,019,229 | Leahy | Oct. 29, 1935 |
| 2,250,472 | De Long | July 29, 1941 |
| 2,310,487 | De Long | Feb. 9, 1943 |

FOREIGN PATENTS

| Number | Country | Date |
| --- | --- | --- |
| 218,619 | Great Britain | July 4, 1924 |